(12) United States Patent
Wang et al.

(10) Patent No.: US 12,430,703 B2
(45) Date of Patent: Sep. 30, 2025

(54) METHOD, DEVICE, AND COMPUTER PROGRAM PRODUCT FOR IMAGE PROCESSING

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 342 days.

(21) Appl. No.: 18/127,135

(22) Filed: Mar. 28, 2023

(65) Prior Publication Data
US 2024/0289910 A1    Aug. 29, 2024

(30) Foreign Application Priority Data
Feb. 28, 2023   (CN) .......................... 202310199997.7

(51) Int. Cl.
*G06T 1/00* (2006.01)
(52) U.S. Cl.
CPC ...... *G06T 1/005* (2013.01); *G06T 2201/0065* (2013.01)
(58) Field of Classification Search
CPC .......................... G06T 1/005; G06T 2201/0065
See application file for complete search history.

(56) References Cited

U.S. PATENT DOCUMENTS

| | | | |
|---|---|---|---|
| 2009/0060261 A1* | 3/2009 | Wang | H04N 1/32208 382/100 |
| 2009/0141927 A1* | 6/2009 | Wang | G06T 1/0085 382/100 |
| 2010/0177977 A1* | 7/2010 | Seshadri | H04N 19/467 382/248 |
| 2019/0045078 A1* | 2/2019 | Tung | H04N 1/32229 |
| 2019/0379899 A1* | 12/2019 | Sugahara | G06T 1/0085 |
| 2022/0414456 A1* | 12/2022 | Malaya | G06N 3/0475 |

OTHER PUBLICATIONS

Jie Zhangy, Dongdong Cheny, Jing Liao, Han Fang, Weiming Zhang, Wenbo Zhou, Hao Cui, Nenghai Yu, Model Watermarking for Image Processing Networks, 2020 (Year: 2020).*

(Continued)

*Primary Examiner* — Kevin Ky
(74) *Attorney, Agent, or Firm* — Ryan, Mason & Lewis, LLP

(57) ABSTRACT

Embodiments of the present disclosure relate to a method, a device, and a computer program product for image processing. The method includes generating from an input image a corresponding output image, and determining watermark embedding of a target watermark by an embedding network. The method further includes generating, by the embedding network, a watermarked image corresponding to the output image based on the output image and the watermark embedding, wherein the target watermark is invisible in the watermarked image and can be extracted from the watermarked image by an extraction network corresponding to the embedding network. Without reducing the practicability of an image generation tool, this solution can provide more effective protection for an image generated thereby and the tool itself so as to prevent theft of the image and functions of the tool.

20 Claims, 5 Drawing Sheets

(56) References Cited

OTHER PUBLICATIONS

J. Zhang et al., "Deep Model Intellectual Property Protection via Deep Watermarking," arXiv:2103.04980v1, Mar. 8, 2021, 14 pages.
J. Zhu et al., "Hidden: Hiding Data With Deep Networks," arXiv:1807.09937v1, Jul. 26, 2018, 22 pages.
M. Tancik et al., "Stegastamp: Invisible Hyperlinks in Physical Photographs," arXiv:1904.05343v2, Mar. 26, 2020, 13 pages.
Y. Uchida et al., "Embedding Watermarks into Deep Neural Networks," arXiv:1701.04082v2, Apr. 20, 2017, 10 pages.
Y. Adi et al., "Turning Your Weakness Into a Strength: Watermarking Deep Neural Networks by Backdooring," arXiv:1802.04633v2, Feb. 14, 2018, 16 pages.
J. Zhang et al., "Passport-aware Normalization for Deep Model Protection," Advances in Neural Information Processing Systems, vol. 33, Dec. 2020, 10 pages.
L. Fan et al., "Rethinking Deep Neural Network Ownership Verification: Embedding Passports to Defeat Ambiguity Attacks," Advances in Neural Information Processing Systems, vol. 32, Dec. 2019, 10 pages.

\* cited by examiner

METHOD, DEVICE, AND COMPUTER PROGRAM PRODUCT FOR IMAGE PROCESSING

RELATED APPLICATION

The present application claims priority to Chinese Patent Application No. 202310199997.7, filed Feb. 28, 2023, and entitled "Method, Device, and Computer Program Product for Image Processing," which is incorporated by reference herein in its entirety.

FIELD

Embodiments of the present disclosure relate to computer technologies, and more specifically, relate to a method, a device, and a computer program product for image processing.

BACKGROUND

In the field of artificial intelligence, machine learning models play an increasingly important role. The training of these machine learning models usually requires substantial processing resources, labeling data, and human knowledge, so the cost is very high. Model providers spend significant costs on training these models, and usually expect the trained models to provide business value for them.

Therefore, in order to protect an owner's benefits and interests in the trained models, an effective mechanism is needed to protect the machine learning models provided by the owner to prevent unauthorized use of the models.

SUMMARY

Illustrative embodiments of the present disclosure provide a solution for image processing.

In a first aspect of the present disclosure, a method for image processing is provided. The method includes: generating from an input image a corresponding output image; determining watermark embedding of a target watermark by an embedding network; and generating, by the embedding network, a watermarked image corresponding to the output image based on the output image and the watermark embedding, where the target watermark is invisible in the watermarked image and can be extracted from the watermarked image by an extraction network corresponding to the embedding network.

In a second aspect of the present disclosure, an electronic device is provided that includes a processor and a memory coupled to the processor, wherein the memory has instructions stored therein which, when executed by the processor, cause the electronic device to perform actions including: generating from an input image a corresponding output image; determining watermark embedding of a target watermark by an embedding network; and generating, by the embedding network, a watermarked image corresponding to the output image based on the output image and the watermark embedding, where the target watermark is invisible in the watermarked image and can be extracted from the watermarked image by an extraction network corresponding to the embedding network.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to execute the method according to the first aspect of the present disclosure.

It should be noted that this Summary is provided to introduce a selection of concepts in a simplified manner, which will be further described in the Detailed Description below. The Summary is neither intended to identify key features or major features of content of the present disclosure, nor intended to limit the scope of the content of the present disclosure.

BRIEF DESCRIPTION OF THE DRAWINGS

By further detailed description of example embodiments of the present disclosure, provided herein with reference to the accompanying drawings, the above and other objectives, features, and advantages of the present disclosure will become more apparent, in which.

Throughout all the drawings, the same or similar reference numerals represent the same or similar elements.

DETAILED DESCRIPTION

Figure 1:
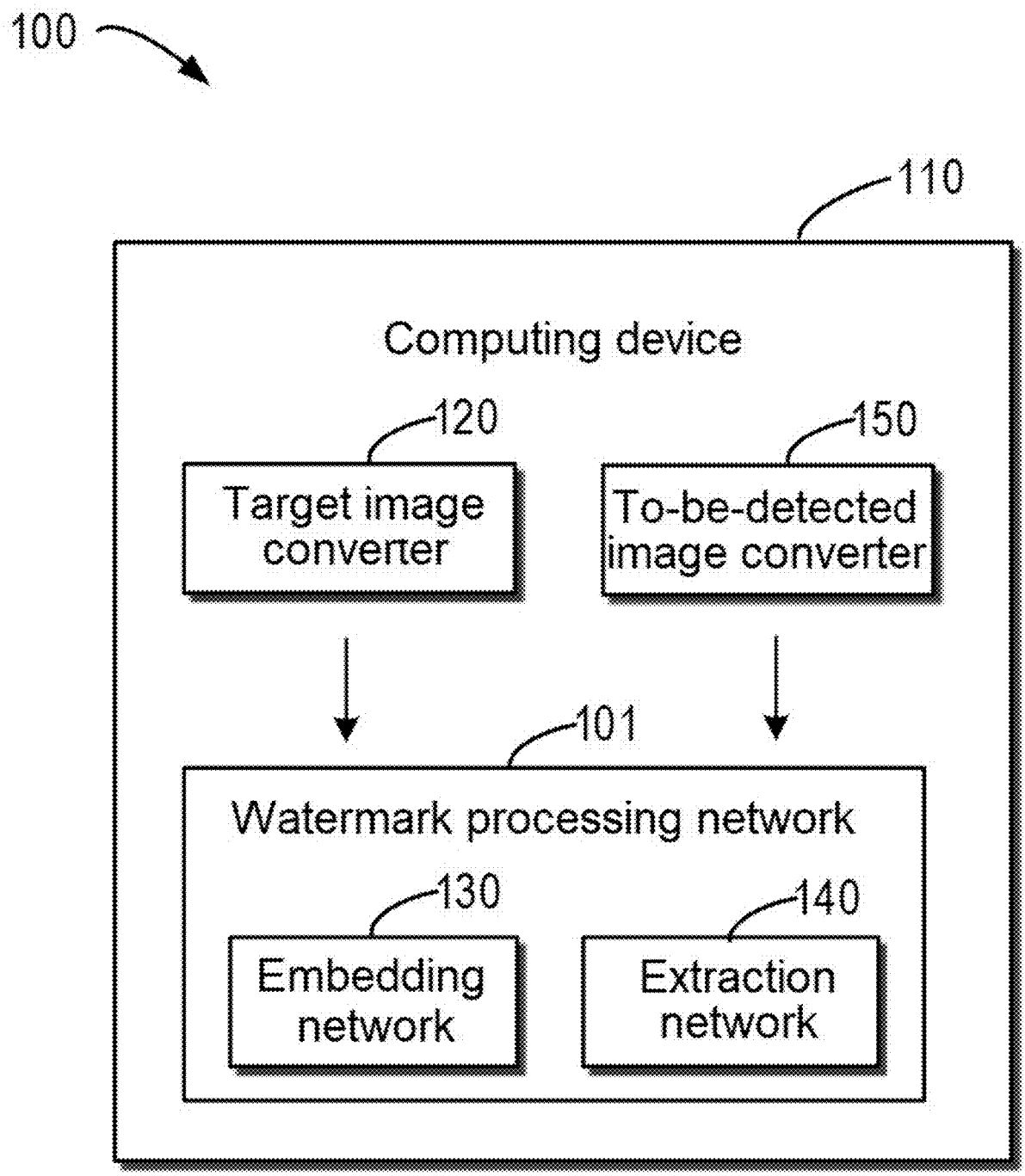
FIG. 1 shows a schematic diagram of an example environment in which a plurality of embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

Training of an image converter based on machine learning models often has high cost, and model owners expect the trained models to provide business value. Therefore, an effective mechanism is needed to protect such machine learning models to prevent unauthorized use of the models.

In some traditional methods, digital watermarks are embedded into a model during model training so that model owners can mark their models. However, this method cannot prevent attackers from using model extraction to steal functions of the models. In model extraction, attackers can use information provided by the output of the original model to train a surrogate model, so that the surrogate model can learn the function mode that the original model utilizes to provide output from the input.

Other methods try to add a consistent visible watermark to the input of the original model. The visible watermark will also be included in the output of the surrogate model trained by using the watermarked original output, so that the surrogate model that extracts the original model function can be recognized. However, the additional visible watermark seriously reduces the visual quality and practicability of the original model. In addition, such visible watermarks can be manually deleted using image editing software.

To at least partially solve the above problems and other potential problems, embodiments of the present disclosure provide a solution for image processing. In the solution, after a to-be-protected target image converter, for example, generates from an input image a corresponding output image, an embedding network determines feature embedding for a target watermark that should be embedded in the output image. The embedding network then generates a watermarked image corresponding to the input image based on the output image and the watermark embedding. In the watermarked image, the target watermark is invisible, but can be extracted from a watermarked image by an extraction network corresponding to the embedding network.

In some embodiments, the extraction network is then used to detect whether a certain image converter has stolen functions of the target image converter. The extraction network can extract, by the image converter, a watermark from an output image generated from the input image, and determines whether the extracted watermark matches the target watermark. The matching result can then be presented to users. If the two watermarks are matched, it indicates that the detected image converter may have extracted the functions of the target image converter without authorization, for example, by training a surrogate model.

By means of the solution of embodiments of the present disclosure, adding a watermark to an output image of an image converter will neither change a structure and/or a training process of the image converter, nor affect visual effects of the output image. In addition, when an attacker attempts to use such a watermarked image to train the surrogate model to steal functions of the image converter, the surrogate model will output an image containing the watermark. The watermark cannot be extracted or eliminated by simple rules, but can be extracted and detected by using a corresponding extraction network. Compared with a traditional image watermark system, the method of embodiments of the present disclosure can, without reducing the practicability of an image generation tool, provide more effective protection for an image generated thereby and the tool itself.

FIG. 1 is a schematic diagram of example environment 100 in which a plurality of embodiments of the present disclosure can be implemented. Environment 100 may include computing device 110. Computing device 110 can be implemented as various devices with required computing capabilities. Examples of computing device 110 include, but are not limited to, a server of a provider of target image converter 120, a large computing device, a desktop computer, a tablet computer, a laptop computer, or any combination thereof. It should be understood that although shown as a single device, computing device 110 can also be implemented in any other form suitable for performing corresponding functions, such as computing cluster or a cloud architecture.

Computing device 110 may provide protection for target image converter 120 by means of the method according to embodiments of the present disclosure. Target image converter 120 can provide specific image conversion functions, for example, generating a cartoon avatar from a real person avatar, or change a style of an input image. Target image converter 120 may be a trained machine learning model or generated in any other manner. Embodiments of the present disclosure are not limited to specific functions and structures of target image converter 120. For example, target image converter 120 can provide functionality via invocation of an application programming interface (API), while hiding its internal implementation details.

The computing device 110 further comprises a watermark processing network 101 that includes an embedding network 130 and an extraction network 140.

Computing device 110 can add an invisible target watermark to an output image of target image converter 120 by using embedding network 130. In addition, computing device 110 can also use extraction network 140 corresponding to embedding network 130 to extract an invisible watermark from an image. For example, computing device 110 can use extraction network 140 to extract an invisible watermark in the image from the output image of to-be-detected image converter 150, for example, extract it as feature encoding that can be used for subsequent classification or conversion into an image. Computing device 110 may also compare the extracted watermark with the target watermark to determine whether they are matched. The matching result can be used to judge whether to-be-detected image converter 150 has stolen functions of target image converter 120.

In some embodiments, computing device 110 may also train watermark processing network 101 including embedding network 130 and extraction network 140, so as to enable them to execute watermark embedding and extracting functions, which will be described in more detail later.

The architecture and functions in example environment 100 are described for illustrative purposes only, and do not imply any limitation to the scope of the present disclosure. There may also be other devices, systems, or components that are not shown in example environment 100. Furthermore, embodiments of the present disclosure may also be applied to other environments having different structures and/or functions.

Figure 2:
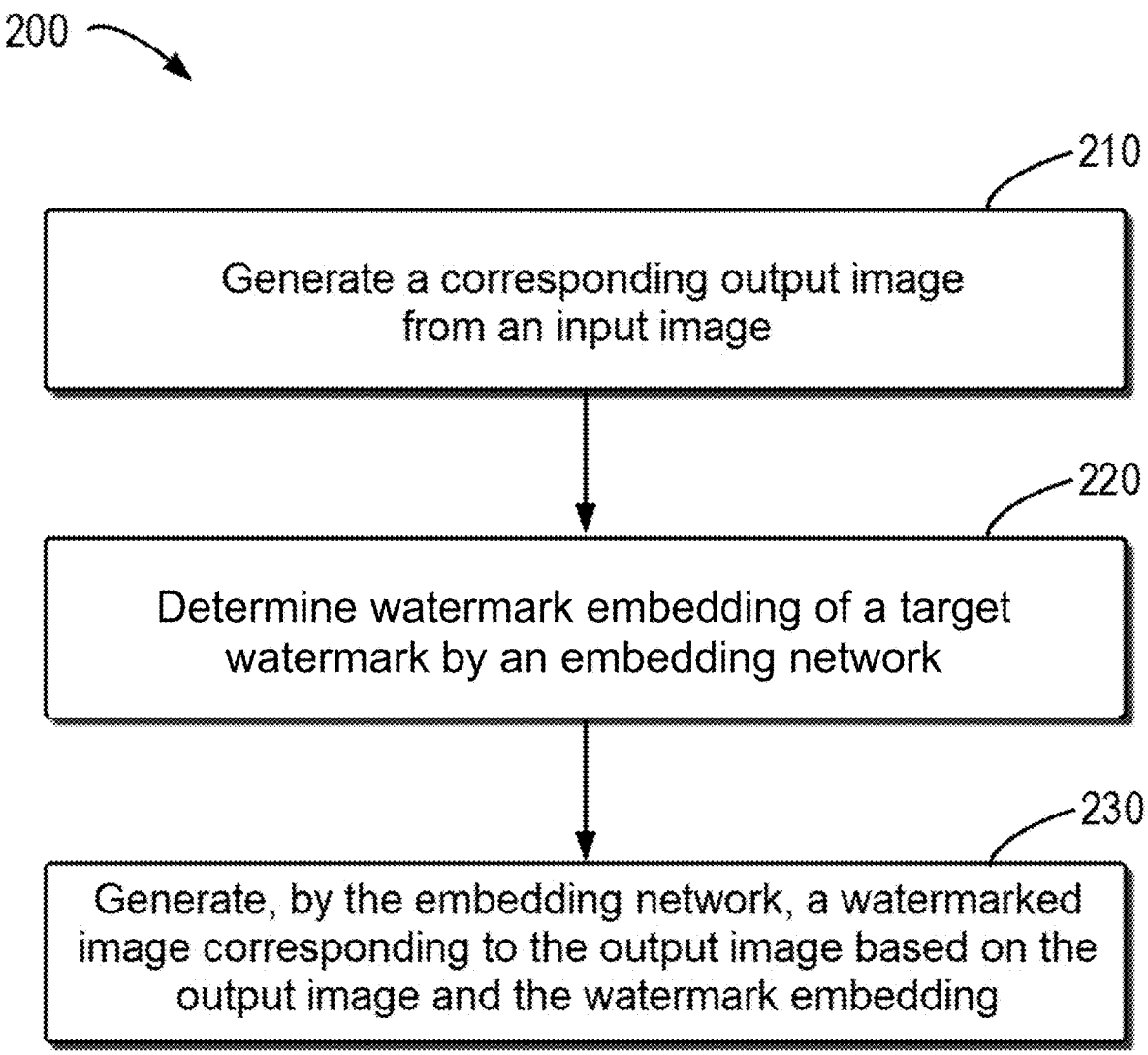
FIG. 2 is a flow chart of an example method for image processing according to some embodiments of the present disclosure.

Now with reference to FIG. 2, a flow chart of example method 200 for image processing according to some embodiments of the present disclosure is shown. For example, example method 200 may be executed by computing device 110 shown in FIG. 1. It should be understood that method 200 may also include additional actions not shown, and the scope of the present disclosure is not limited in this regard. Method 200 is described in detail below in conjunction with example environment 100 of FIG. 1.

At block 210, a corresponding output image is generated from an input image. For example, computing device 110 may generate the corresponding output image from the input image. In some embodiments, computing device 110 may provide the input image for target image converter 120 to generate a corresponding output image. As stated above, target image converter 120 can provide specific image conversion functions.

At block 220, an embedding network determines watermark embedding of a target watermark. For example, computing device 110 may determine, by means of embedding network 130, watermark embedding of embedding the target watermark to the output image. Embedding network 130 may be a trained neural network (for example, with UNet or other appropriate structures), which is trained to embed a specific target watermark into an image in an invisible way, which will be described in more detail later.

In some embodiments, embedding network 130 may be a part of watermark processing network 101 associated with the target watermark, and watermark processing network 101 may also include extraction network 140 which is paired with the embedding network 130. Extraction network 140 may be a trained neural network (for example, with CEIL-Net or other appropriate structures), and it is trained to extract a target watermark from an image when the image is embedded with the target watermark.

In some embodiments, extraction network 140 may also be trained to extract a specific default watermark from an image when this target watermark is not embedded into the image. The target watermark may be associated with target image converter 120, for example, the target watermark may represent an identifier of an owner of target image converter 120, or other icons that can identify target image converter 120 or its owner.

At block 230, a watermarked image corresponding to the output image is generated by the embedding network based on the output image and watermark embedding. The target watermark is invisible in the watermarked image, and can be extracted from the watermarked image by the extraction network corresponding to the embedding network. For example, computing device 110 can enable embedding network 130 to generate a watermarked image corresponding to the output image based on the output image and the watermark embedding obtained at block 210 and block 220.

In the action, computing device 110 embeds the target watermark into the output image in an invisible way, thereby generating the watermarked image. The output image and the watermarked image embedded with the target watermark basically have no visually-perceptible difference. Users cannot see the target watermark visually from the watermarked image. In some embodiments, embedding network 130 may be combined with target image converter 120 so as to automatically add the specific target watermark to the output image when the target image converter 120 generates it. In this way, when target image converter 120 is used (for example, invoked by a corresponding API), the output image that a user can obtain is actually the watermarked image with the invisible watermark added.

By means of method 200, a watermark that can be detected using a corresponding extraction network is added to an image without changing an image converter that generates the image or affecting visual effects of the image, so that the image can be protected. Moreover, adding such watermark can prevent attackers from using the output image of the image converter to train the surrogate model to steal the functions of the image converter, because the trained watermarked image will output an image containing the watermark.

For example, when training a surrogate model that imitates target image converter 120, attackers use target image converter 120 to generate a large number of input-output image pairs. When embedding network 130 is used to add the target watermark to the actual output of target image converter 120, the image obtained by an attacker is actually embedded with the invisible watermark. Such image is used to train the surrogate model. In order to reduce loss in training to achieve a training goal, target image converter 120 will be forced to include the invisible watermark embedding in its input. Therefore, the target watermark can be extracted from the output of the to-be-detected image converter by means of extraction network 140 so as to detect whether the image converter is based on a surrogate model that has stolen functions of target image converter 120. Such watermarks cannot be visually distinguished, nor can they be eliminated according to simple rules. Compared with visible watermarks or watermarks added according to simple patterns (such as changing pixel values with certain rules or adding watermarks to a certain color segment), they can provide more effective protection.

Figure 3:
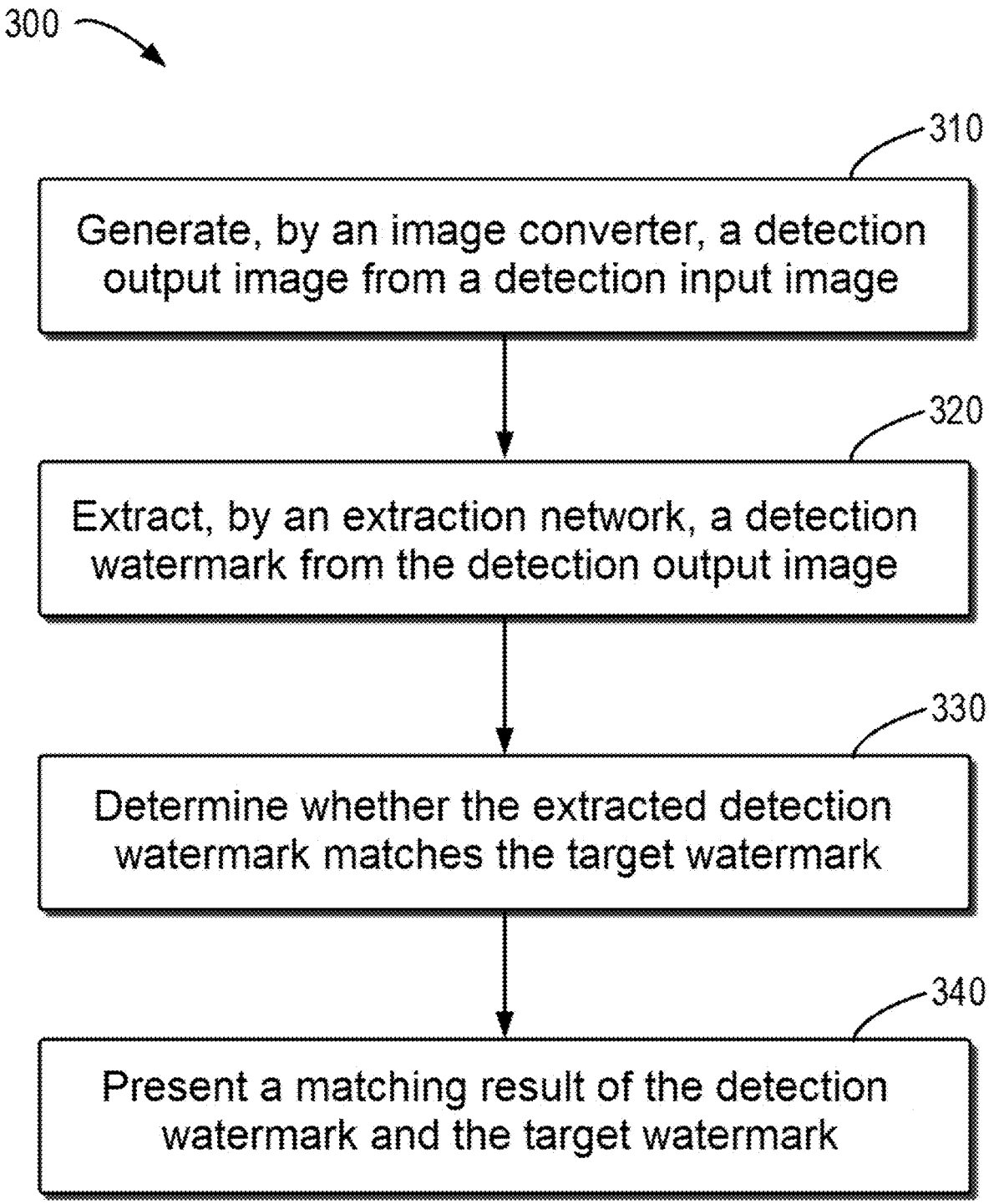
FIG. 3 is a flow chart of an example method for image processing according to some embodiments of the present disclosure.

Now with reference to FIG. 3, a flow chart of example method 300 for image processing according to some embodiments of the present disclosure is shown. On the basis of protecting an image converter by means of method 200, method 300 may be used to detect whether a suspicious image converter has stolen functions of the protected image converter. Example method 300 may be executed by computing device 110 as shown in FIG. 1. It should be understood that method 300 may also include additional actions not shown, and the scope of the present disclosure is not limited in this regard. Method 300 is described in detail below in conjunction with example environment 100 of FIG. 1.

At block 310, computing device 110 may enable an image converter to generate a detection output image from a detection input image. In this action, computing device 110 does not need to know an internal structure of the image converter, but only needs to obtain the output from it for detection. Moreover, similar to the to-be-protected target image converter, embodiments of the present disclosure are not limited to specific functions of the to-be-detected image converter.

At block 320, computing device 110 may enable extraction network 140 to extract a detection watermark from the detection output image. As stated above, extraction network 140 corresponds to embedding network 130, and can extract an invisible target watermark from an image when the image is embedded with the target watermark. The target watermark of the image not only can be embedded into the image by embedding network 130 itself (for example, according to method 200), but also can be an output of an illegally trained surrogate model.

At block 330, computing device 110 may determine whether the extracted detection watermark matches the target watermark. In some embodiments, computing device 110 may calculate the normalized correlation (NC) between the two according to the following formula (1), and determine whether they are matched when the correlation meets a threshold. In formula (1), where $<\bullet,\bullet>$ and $\|\bullet\|$ are respectively inner product and L2 norm form symbols, $R(b'_i)$ represents that R extracts and outputs the watermark of the output image ($b'_i$), and $\delta$ represents the target watermark:

$$NC = \frac{<R(b'_i), \delta>}{\|R(b'_i)\| * \|\delta\|} \quad (1)$$

In some other embodiments, extraction network 140 can be combined with an additional classifier. The classifier can be trained with extraction network 140 to classify watermark output extracted by extraction network 140. The classification indicates whether the extracted watermark matches the target watermark. For example, the classification can be "matched" or "unmatched" indicated by 1 and 0 respectively. It should be understood that in some embodiments, the classifier can be trained according to particular needs, for example, to make additional classifications to reflect a matching degree. The training of the classifier will be described later in combination with FIGS. 4 and 5.

Now, with continued reference to FIG. 3, at block 340, computing device 110 presents a matching result of the detection watermark and the target watermark. In some embodiments, computing device 110 may present relevant values of the matching calculation to a user for consideration. In some embodiments, computing device 110 may convert the extracted watermark into a visible image and present it to the user.

For example, when matched, the visible image form of the watermark can be basically the same as the image form of the target watermark. When they are unmatched, according to trained specific functions of watermark processing network 101, the visible image form of the watermark can be the image form of a default watermark (for example, a blank image) or an image form different from the target watermark in other ways so as to indicate that the detected output image does not include the target watermark.

In some embodiments, computing device 110 may also present other notices corresponding to the matching result. For example, in some embodiments in which a classifier is used, computing device 110 may concisely present a result notice of "match" or "mismatch" to the user.

By using method 300 in combination with method 200, it can be determined whether a suspicious image converter has illegally extracted functions of a target image converter by detecting the output of the image converter, so as to provide effective protection against attack of the surrogate model for the target image converter.

In some embodiments, computing device 110 can train watermark processing network 101 including embedding network 130 and extraction network 140 for target image converter 120 and the target watermark associated with target image converter 120. Such trained watermark processing network 101 can be used to protect target image converter 120, for example, according to above method 200 and method 300.

Figure 4:
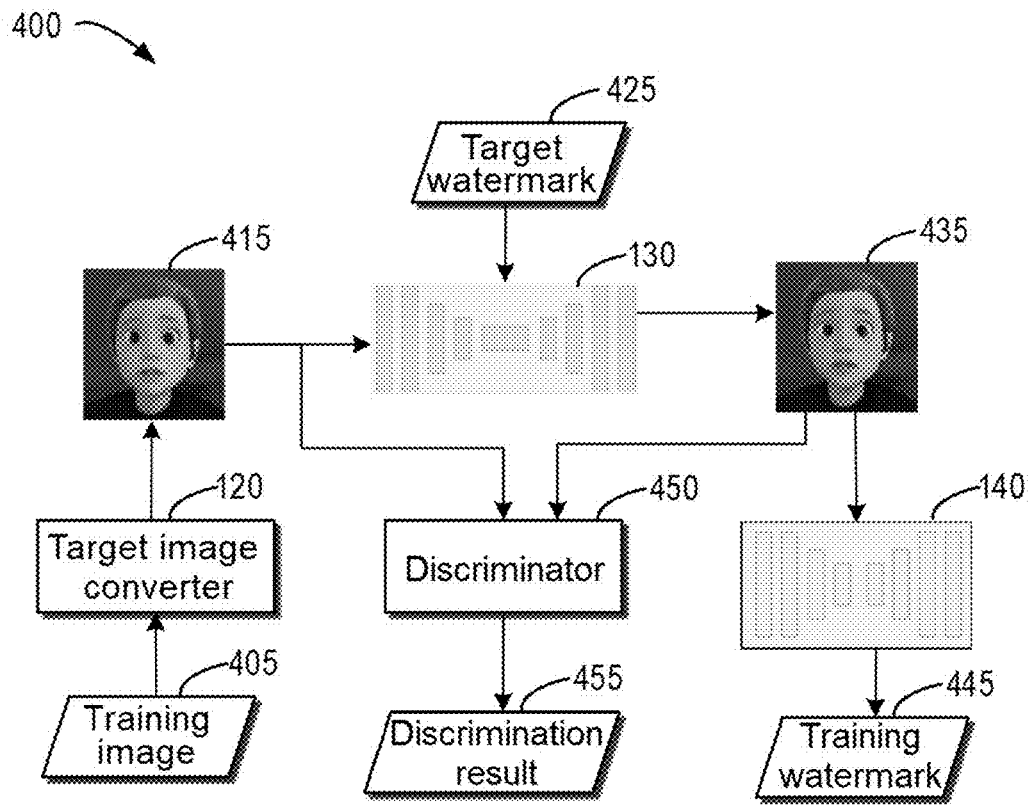
FIG. 4 shows an example workflow for training a watermark processing network according to some embodiments of the present disclosure.

Now with reference to FIG. 4, example workflow 400 is shown for training a watermark processing network according to some embodiments of the present disclosure, and workflow 400 may be executed, for example, by computing device 110 as shown in FIG. 1. Example workflow 400 includes steps of training for watermark processing network 101, and watermark processing network 101 includes embedding network 130 and extraction network 140. It should be understood that workflow 400 in FIG. 4 is merely an example, and in some embodiments, training of the watermark processing network may include more actions and elements, and/or some actions and elements thereof can be omitted.

In workflow 400, computing device 110 first inputs training image 405 into target image converter 120 to generate output image 415. In the example of FIG. 4, output image 415 is shown as a cartoon avatar. However, it should be understood that the method of embodiments of the present disclosure is also applicable to image conversion tools that generate images of other types.

Then, current embedding network 130 generates, from output image 415, watermarked image 435 corresponding to the output image. In this step, embedding network 130 embeds target watermark 425 corresponding to target image converter 120 into watermarked image 435 in an invisible way. Then, computing device 110 uses current extraction network 140 to extract training watermark 445 from watermarked image 435.

In a case where training of watermark processing network 101 is completed, watermarked image 435 will be substantially visually similar to output image 415 and cannot be distinguished visually therefrom. In another aspect, training watermark 445 and target watermark 425 will meet sufficient similarity and can be judged as identical watermarks. Therefore, computing device 110 can adjust parameters of watermark processing network 101 according to one or more of the differences (for example, calculated in the form of a loss function) between the various inputs and outputs in the training steps shown in the figure in a manner of reducing these differences. For example, a total target loss function $\mathcal{L}_v$ of such a round of training may be shown as the following formula (2), where $\mathcal{L}_{emd}$ represents loss related to watermark embedding, $\mathcal{L}_{ext}$ represents loss related to watermark extraction, and $\lambda$ represents a hyperparameter balancing the two loss terms:

$$\mathcal{L}_v = \mathcal{L}_{emd} + \lambda * \mathcal{L}_{ext} \tag{2}$$

In some embodiments, computing device 110 may adjust watermark processing network 101 based on a visual difference between output image 415 and watermarked image 435, so as to reduce, as much as possible, the visual difference of an image before and after embedding a watermark to the image by means of embedding network 130. For example, computing device 110 can adjust watermark processing network 101 based on at least one of a pixel value difference and a perception difference between output image 415 and watermarked image 435.

For example, a loss term $\ell_{bs}$ regarding the pixel value difference in the target function can be calculated by the following formula (3), where B represents a set of output images (including output image 415) generated by target image converter 120 from a training data set A (including training image 405), and B' represents a set of watermarked images generated by embedding network 130 from B, and $N_c$ represents a total number of pixels of image $b_i$:

$$\ell_{bs} = \sum_{b'_i \in B', b_i \in B} \frac{1}{N_c} \|b'_i - b_i\|^2 \tag{3}$$

For example, a loss term $\ell_{vgg}$ regarding the perception difference can be quantized as a visual geometry group (VGG) feature difference between the output image and the watermarked image, as shown by the following formula (4), where $VGG_k(\cdot)$ indicates a feature extracted from the kth layer of the network, and $N_f$ indicates a total number of feature neurons, as defined by the usual VGG feature difference calculation:

$$\ell_{vgg} = \sum_{b'_i \in B', b_i \in B} \frac{1}{N_f} \|VGG_k(b'_i) - VGG_k(b_i)\|^2 \tag{4}$$

In some embodiments, in order to improve and reduce the visual difference of images before and after watermark embedding and improve the embedding quality, computing device 110 may also use discriminator 450 to generate a set of discrimination results 455 for output image 415 and watermarked image 435, and the set of discrimination results indicate whether corresponding images include the target watermark. Computing device 110 may adjust watermark processing network 101 based on the set of discrimination results.

In some embodiments, discriminator 450 can train watermark processing network 101 and train discriminator 450 in turn by means of adversarial learning algorithms (such as PatchGAN). When discriminator 450 is fixed to train watermark processing network 101, discriminator 450 is made to be unable, as much as possible, to distinguish the difference between the watermarked image generated by embedding network 130 and the image without a watermark; and when the discriminator is trained, it is enabled, as much as possible, to distinguish the watermarked image generated by embedding network 130.

When watermark processing network 101 is fixed and discriminator 450 is adjusted, computing device 110 can generate a corresponding output image (which is hereinafter referred to as a second output image) from another image (which is referred to as a second training image in the following text for clarity) in the training set by means of target image converter 120, and add the target watermark to the second output image by means of the embedding network to generate a corresponding watermarked image (which is hereinafter referred to as a second watermarked image). Then, computing device 110 can similarly use discriminator 450 to generate a second set of discrimination results for the image in the second output image and the second watermarked image, and adjust discriminator 450 based on the second set of discrimination results.

When watermark processing network 101 is trained, an adversarial loss term $\ell_{adv}$ regarding the discrimination result is shown by the following formula (5), as usually defined in the adversarial learning, where $D(b_i)$ represents a discrimination result for output image $b_i$ by discriminator 450, and $D(b'_i)$ represents a discrimination result for watermarked image $b'_i$ by discriminator 450:

$$\ell_{adv} = \mathbb{E}_{b_i \in B} \log(D(b_i)) + \mathbb{E}_{b'_i \in B'} \log(1 - D(b'_i)) \quad (5)$$

In some embodiments, computing device 110 may adjust parameters of watermark processing network 101 based on the above multiple losses. In this way, an embedded loss term in the target loss function can be shown by the following formula (6), where $\lambda_1$, $\lambda_2$, and $\lambda_3$ are hyperparameters balancing the terms:

$$\mathcal{L}_{emd} = \lambda_1 * \ell_{bs} + \lambda_2 * \ell_{vgg} + \lambda_3 * \ell_{adv} \quad (6)$$

Regarding the difference related to extraction, in some embodiments, computing device 110 may adjust watermark processing network 101 based on a difference between training watermark 445 and target watermark 425 (which is also referred to as a reconstruction loss for the target watermark). For example, the reconstruction loss may be represented in a loss function as a loss term $\ell_{wm}$ as shown by the following formula (7), where $b'_i$ represents a detection watermark extracted by extraction network 140 from watermarked image $b'_i$, $\delta$ represents a target watermark, and the above formulas can be referred to for other symbols:

$$\ell_{wm} = \sum_{b'_i \in B'} \frac{1}{N_c} \|R(b'_i) - \delta\|^2 \quad (7)$$

In some embodiments, computing device 110 may also use extraction network 140 to extract a set of training default watermarks from an image in training image 405 and output image 415 (i.e., an image without embedding the target watermark), and adjust watermark processing network 101 based on a difference between a training default watermark in the set of training default watermarks and the target default watermark. The target default watermark can be, for example, a blank watermark or another certain watermark. Such term can be represented in a loss function as, for example, a loss term $\ell_{clean}$ in the following formula (8), where A represents a training data set including training image 405, $\delta_0$ represents a default watermark, $R(\cdot)$ represents the detection watermark extracted from a corresponding image by extraction network 140, and the above formulas can be referred to for other symbols:

$$\ell_{clean} = \sum_{a_i \in A} \frac{1}{N_c} \|R(a_i) - \delta_0\|^2 + \sum_{b_i \in B} \frac{1}{N_c} \|R(b_i) - \delta_0\|^2 \quad (8)$$

Such a loss term is applied to training of watermark processing network 101, and extraction network 140 can be trained to extract, when a to-be-detected image is not embedded with the target watermark, a blank watermark from the image.

In some embodiments, computing device 110 can also adjust watermark processing network 101 by making the watermarks extracted from the watermarked images by extraction network 140 as consistent as possible. In such embodiment, computing device 110 can enable target image converter 120 to generate an output image (which is referred to as a third output image) from another training image (which is referred to as a third training image in the following text for clarity) different from training image 405, enable embedding network 130 to generate a watermarked image (which is referred to as a third watermarked image) corresponding to the third output image, and enable extraction network 140 to extract a third training watermark (which is referred to as a third training watermark) from the third watermarked image. Computing device 110 can then adjust watermark processing network 101 based on a difference between the first training watermark and the third training watermark. The consistency loss fest associated with the difference is shown by the following formula (9), and the above formulas can be referred to for the symbols therein:

$$\ell_{cst} = \sum_{x,y \in B'} \|R(x) - R(y)\|^2 \quad (9)$$

In some embodiments, computing device 110 can adjust parameters of watermark processing network 101 based on the above multiple losses. In this way, an extraction loss term in the target loss function can be shown by the following formula (10), where 14, 15, and 16 are hyperparameters balancing the terms:

$$\mathcal{L}_{ext} = \lambda_4 * \ell_{wm} + \lambda_5 * \ell_{clean} + \lambda_6 * \ell_{cst} \quad (10)$$

If watermark processing network 101 is only trained with a watermarked image generated by itself, when extraction network 140 extracts a watermark from noisy watermarked images generated by means of some surrogate models, its extraction quality may need to be improved. To further improve the extraction quality of watermark processing network 101, in some embodiments, after watermark processing network 101 is trained in the above way, computing device 110 can simulate the function theft behavior of an attacker to train the proxy's surrogate model, and use the trained surrogate model to further fine-tune extraction network 140. In this stage of training, extraction network 140 is fixed, while extraction network 140 continues to be adjusted.

Figure 5:
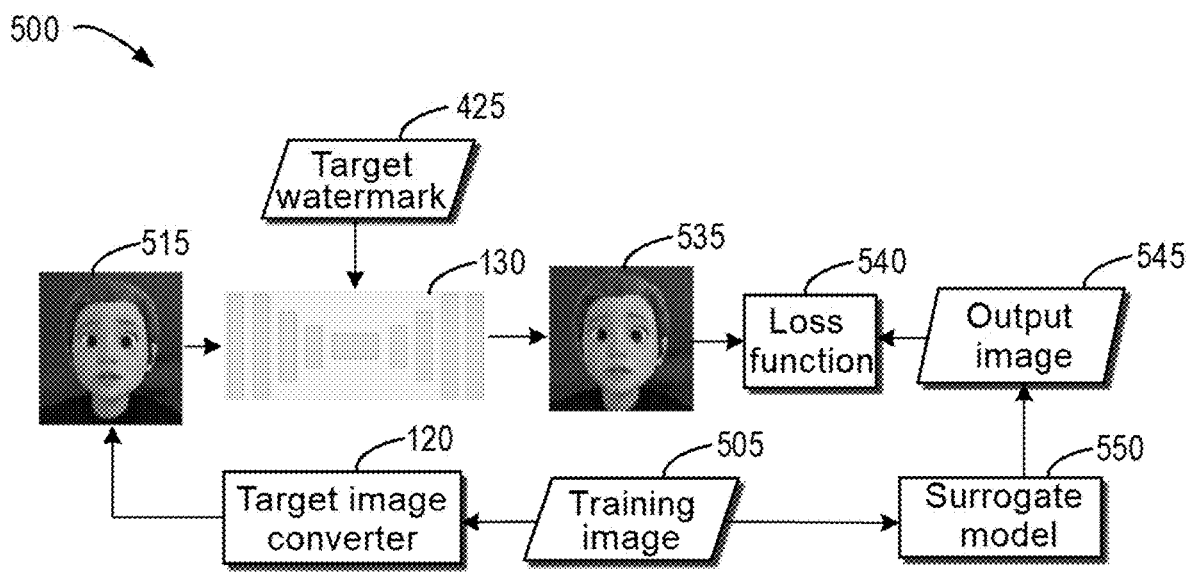
FIG. 5 shows an example workflow for training a watermark processing network according to some embodiments of the present disclosure.

Now with reference to FIG. 5, example workflow 500 is shown for training a watermark processing network according to some embodiments of the present disclosure. Workflow 500 can be executed by computing device 110 as shown in FIG. 1, and after watermark processing network 101 (not shown in its entirety) is trained preliminarily, for example, according to workflow 400 as shown in FIG. 4, can be executed as a sub-stage of simulating the function theft behavior of the attacker in a second stage of training.

In workflow 500, computing device 110 trains surrogate model 550 by means of target image converter 120 and extraction network 140, and surrogate model 550 can use a conventional neural network structure such as UNet. As shown in the figure, output image 515 is generated from training image 505 by means of a target image converter 120, and target watermark 425 is added to output image 515 by means of trained embedding network 130 so as to generate watermarked image 535. Then, computing device 110 can adjust the surrogate model by using training image 505 and watermarked image 535 as a training pair. As shown in the figure, computing device 110 can enable surrogate model 550 to calculate a difference (i.e., loss) between watermarked image 535 and output image 545 by means of loss function 540 (for example, based on L2 loss) from output image 545 generated by training image 505, and adjust surrogate model 550 by means of the difference. Such trained surrogate model 550 can then be used to further adjust extraction network 140.

Figure 6:
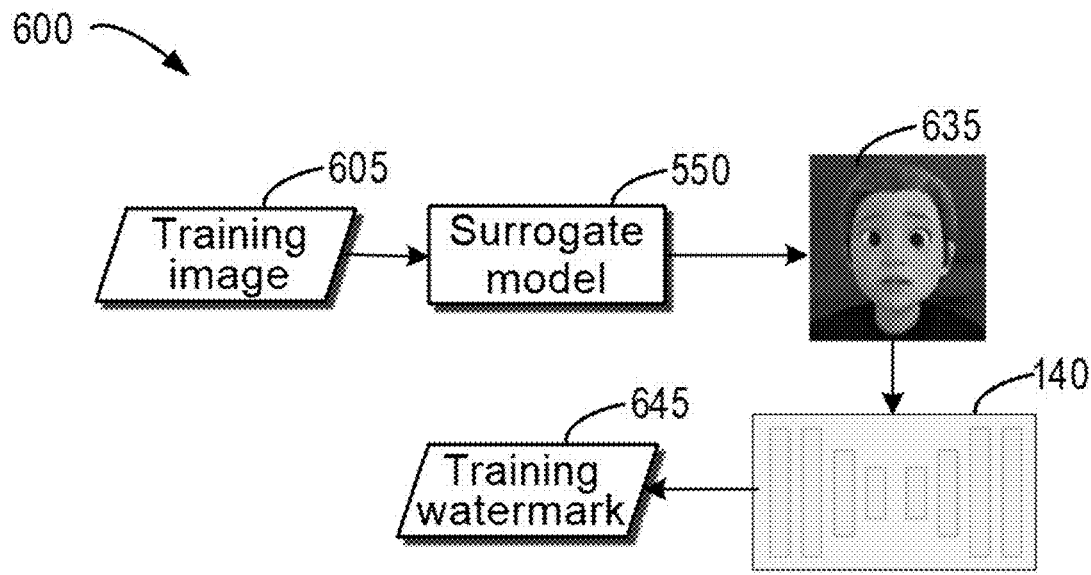
FIG. 6 shows an example workflow for training a watermark processing network according to some embodiments of the present disclosure.

Now with reference to FIG. 6, example workflow 600 is shown for training a watermark processing network according to some embodiments of the present disclosure. Workflow 600 may be executed by computing device 110 as shown in FIG. 1, and can be executed by surrogate model 550 trained according to workflow 500 in FIG. 5 as a defense sub-stage in the second stage of training extraction network 140 to extract the target watermark. Surrogate model 550 is fixed during adjustment of extraction network 140 by means of workflow 600.

As shown in FIG. 6, computing device 110 can use surrogate model 550 to generate output image 635 from new training image 605. Since surrogate model 550 is actually trained by means of the output image embedded with the target watermark, generated output image 635 should include a watermark that can be extracted by extraction network 140 and that is roughly the same as the target watermark (for example, including noise).

Then, computing device 110 can extract training watermark 645 from output image 635 of surrogate model 550 by means of extraction network 140 so as to adjust extraction network 140. For example, computing device 110 can adjust extraction network 140 based on a difference between training watermark 645 and target watermark 425. In this way, the above-described reconstruction loss term of the target function can be adjusted as shown by the following formula (11), where B' represents, as stated above, a set of watermarked images generated by embedding network 130 during training, B" represents a set of watermarked images generated by surrogate model 550 during training, and the above formulas can be referred to for other symbols:

$$\ell_{um} = \sum_{b'_i \in B'} \frac{1}{N_c} \|R(b'_i) - \delta\|^2 + \sum_{b''_i \in B''} \frac{1}{N_c} \|R(b''_i) - \delta\|^2 \quad (11)$$

For example, computing device 110 can also adjust extraction network 140 based on a difference between training watermark 645 and other training watermarks extracted by extraction network 140 during training. In this way, the consistency loss term of the target function as stated above can be adjusted as shown by the following formula (12), and the above formulas can be referred to for symbols therein:

$$\ell_{cst} = \sum_{x,y \in B' \cup B''} \|R(x) - R(y)\|^2 \quad (12)$$

As stated above, when detecting, by means of a watermark network, whether an image is embedded with target watermark 425, an additional classifier can be used to classify watermark output extracted by extraction network 140. The classifier can be a classification network based on a neural network model. In some embodiments, computing device 110 can train a classification network based on adversarial learning and extraction network 140 in pairs during the training stage. Such trained classification network can determine a category of a corresponding watermark extracted by extraction network 140, and the category indicates whether the corresponding watermark matches the target watermark (for example, a target).

Figure 7:
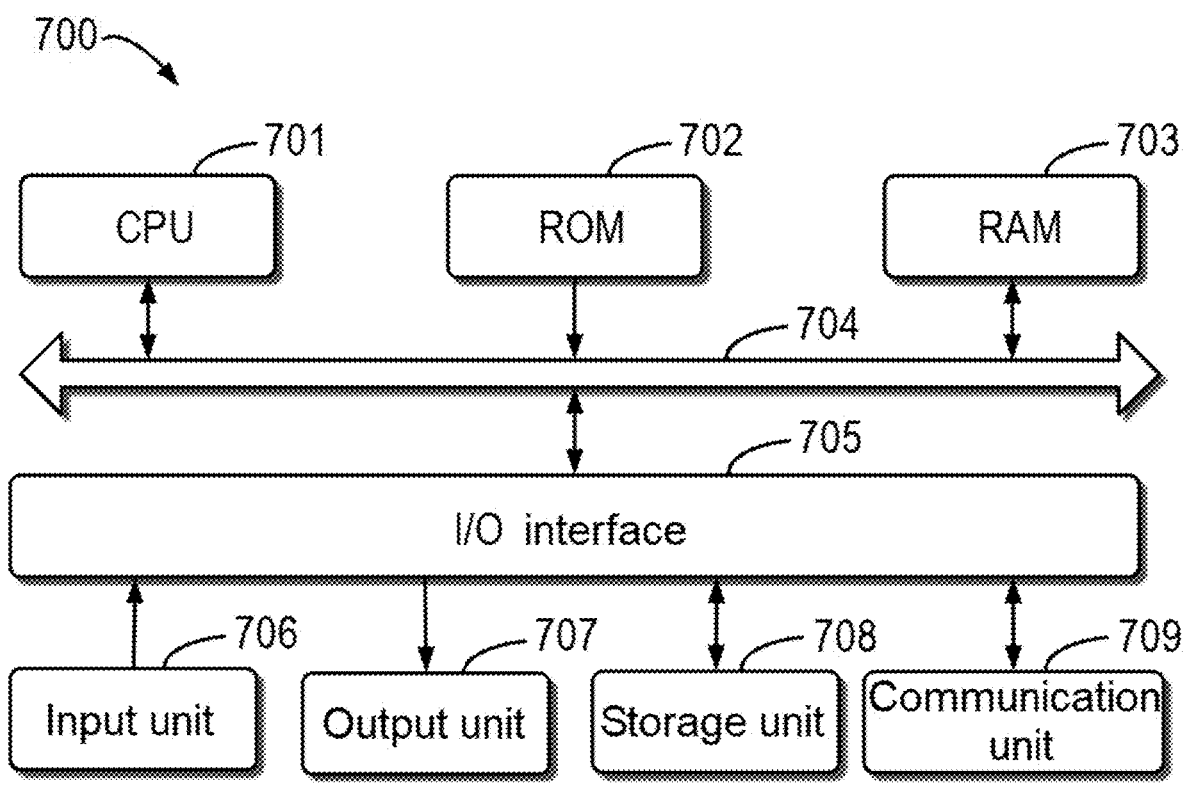
FIG. 7 shows a schematic block diagram of a device that can be used to implement embodiments of the present disclosure.

FIG. 7 shows a schematic block diagram of device 700 that may be configured to implement embodiments of the present disclosure. Device 700 may be the device or apparatus described in embodiments of the present disclosure, for example, computing device 110. As shown FIG. 7, device 700 includes central processing unit (CPU) 701, which may execute various appropriate actions and processing in accordance with computer program instructions stored in read-only memory (ROM) 702 or computer program instructions loaded from storage unit 708 into random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704. Although not shown in FIG. 7, device 700 may also include a co-processor.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit

709, such as a network card, a modem, and a wireless communication transceiver. Communication unit 709 allows device 700 to exchange information/data with other devices via a computer network, such as the Internet, and/or various telecommunication networks.

The various methods or processes described above may be performed by CPU 701. For example, in some embodiments, the methods or processes may be implemented as a computer software program that is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method for image processing, comprising:
    generating from an input image a corresponding output image;
    determining watermark embedding of a target watermark by an embedding network; and
    generating, by the embedding network, a watermarked image corresponding to the output image based on the output image and the watermark embedding, wherein the target watermark is invisible in the watermarked image and can be extracted from the watermarked image by an extraction network corresponding to the embedding network;
    wherein the output image is generated by a target image converter, the target watermark is associated with the target image converter and a watermark processing network comprising the embedding network and the extraction network, and the method further comprises:
    generating, by the target image converter, a first output image from a first training image;
    generating, by the embedding network, a first watermarked image corresponding to the first output image; and
    adjusting the watermark processing network based on a difference between the first output image and the first watermarked image.

2. The method according to claim 1, further comprising:
    generating, by an image converter, a detection output image from a detection input image;
    extracting, by the extraction network, a detection watermark from the detection output image;
    determining whether the detection watermark matches the target watermark; and
    presenting a matching result of the detection watermark and the target watermark.

3. The method according to claim 1, wherein adjusting the watermark processing network comprises:
    adjusting the watermark processing network based on at least one of a pixel value difference and a perception difference between the first output image and the first watermarked image.

4. The method according to claim 1, further comprising:
    generating, by a discriminator, a first set of discrimination results for the first output image and the first watermarked image, wherein a discrimination result in the first set of discrimination results indicates whether a corresponding image comprises the target watermark; and
    adjusting the watermark processing network based on the first set of discrimination results.

5. The method according to claim 4, further comprising training the discriminator by:
    generating a second output image from a second training image by means of the target image converter;
    adding the target watermark to the second output image by means of the embedding network to generate a second watermarked image; and
    generating, by means of a discriminator, a second set of discrimination results of images in the second output image and the second watermarked image, wherein a discrimination result in the second set of discrimination results indicates whether a corresponding image comprises the target watermark; and
    adjusting the discriminator based on the second set of discrimination results.

6. The method according to claim 1, further comprising:
    extracting, by the extraction network, a first training watermark from the first watermarked image; and
    adjusting the watermark processing network based on a difference between the first training watermark and the target watermark.

7. The method according to claim 1, further comprising:
    extracting, by the extraction network, a set of training default watermarks from images of the first training image and the first output image; and
    adjusting the watermark processing network based on a difference between a training default watermark in the set of training default watermarks and a target default watermark.

8. The method according to claim 6, further comprising:
    generating, by the target image converter, a third output image from a third training image;
    generating, by the embedding network, a third watermarked image corresponding to the third output image;
    extracting, by the extraction network, a third training watermark from the third watermarked image; and
    adjusting the watermark processing network based on a difference between the first training watermark and the third training watermark.

9. The method according to claim 1, further comprising:
    generating a fourth output image from a fourth training image by means of a surrogate model, wherein the surrogate model is trained by means of the target image converter and the extraction network;
    extracting, by means of the extraction network, a fourth training watermark from the fourth output image; and
    adjusting the extraction network based on a difference between the fourth training watermark and the target watermark.

10. The method according to claim 9, further comprising training the surrogate model by:
    generating a fifth output image from a fifth training image by means of the target image converter;
    adding the target watermark to the fifth output image by means of the embedding network to generate a fifth watermarked image; and
    adjusting the surrogate model by using the fifth training image and the fifth watermarked image as a training pair.

11. The method according to claim 1, further comprising:
    training a classification network based on adversarial learning and the extraction network in pairs, wherein the classification network is used to determine a category of a corresponding watermark extracted by the extraction network, and the category indicates whether the corresponding watermark matches the target watermark.

12. An electronic device, comprising:
at least one processor; and
memory coupled to the at least one processor, wherein the memory has instructions stored therein which, when executed by the at least one processor, cause the electronic device to perform actions comprising:
generating from an input image a corresponding output image;
determining watermark embedding of a target watermark by an embedding network; and
generating, by the embedding network, a watermarked image corresponding to the output image based on the output image and the watermark embedding, wherein the target watermark is invisible in the watermarked image and can be extracted from the watermarked image by an extraction network corresponding to the embedding network;
wherein the output image is generated by a target image converter, the target watermark is associated with the target image converter and a watermark processing network comprising the embedding network and the extraction network, and the actions further comprise:
generating, by the target image converter, a first output image from a first training image;
generating, by the embedding network, a first watermarked image corresponding to the first output image; and
adjusting the watermark processing network based on a difference between the first output image and the first watermarked image.

13. The electronic device according to claim 12, wherein the actions further comprise:
generating, by an image converter, a detection output image from a detection input image;
extracting, by the extraction network, a detection watermark from the detection output image;
determining whether the detection watermark matches the target watermark; and
presenting a matching result of the detection watermark and the target watermark.

14. The electronic device according to claim 12, wherein adjusting the watermark processing network comprises:
adjusting the watermark processing network based on at least one of a pixel value difference and a perception difference between the first output image and the first watermarked image.

15. The electronic device according to claim 12, wherein the actions further comprise:
generating, by a discriminator, a first set of discrimination results for the first output image and the first watermarked image, wherein a discrimination result in the first set of discrimination results indicates whether a corresponding image comprises the target watermark; and
adjusting the watermark processing network based on the first set of discrimination results.

16. The electronic device according to claim 15, wherein the actions further comprise training the discriminator by:
generating a second output image from a second training image by means of the target image converter;
adding the target watermark to the second output image by means of the embedding network to generate a second watermarked image; and
generating, by means of a discriminator, a second set of discrimination results of images in the second output image and the second watermarked image, wherein a discrimination result in the second set of discrimination results indicates whether a corresponding image comprises the target watermark; and
adjusting the discriminator based on the second set of discrimination results.

17. The electronic device according to claim 12, wherein the actions further comprise:
extracting, by the extraction network, a first training watermark from the first watermarked image; and
adjusting the watermark processing network based on a difference between the first training watermark and the target watermark.

18. A computer program product tangibly stored on a non-transitory computer-readable medium and comprising machine-executable instructions, wherein the machine-executable instructions, when executed by a machine, cause the machine to perform actions comprising:
generating from an input image a corresponding output image;
determining watermark embedding of a target watermark by an embedding network; and
generating, by the embedding network, a watermarked image corresponding to the output image based on the output image and the watermark embedding, wherein the target watermark is invisible in the watermarked image and can be extracted from the watermarked image by an extraction network corresponding to the embedding network;
wherein the output image is generated by a target image converter, the target watermark is associated with the target image converter and a watermark processing network comprising the embedding network and the extraction network, and the actions further comprise:
generating, by the target image converter, a first output image from a first training image;
generating, by the embedding network, a first watermarked image corresponding to the first output image; and
adjusting the watermark processing network based on a difference between the first output image and the first watermarked image.

19. The computer program product of claim 18, wherein adjusting the watermark processing network comprises:
adjusting the watermark processing network based on at least one of a pixel value difference and a perception difference between the first output image and the first watermarked image.

20. The computer program product of claim 18, wherein the actions further comprise:
generating, by a discriminator, a first set of discrimination results for the first output image and the first watermarked image, wherein a discrimination result in the first set of discrimination results indicates whether a corresponding image comprises the target watermark; and
adjusting the watermark processing network based on the first set of discrimination results.

* * * * *